United States Patent
Teske et al.

(10) Patent No.: US 6,278,561 B1
(45) Date of Patent: Aug. 21, 2001

(54) HEAVY-DUTY PRECISION SUPPORT FOR AN OPTICAL INSTRUMENT

(75) Inventors: Hans-Joachim Teske, Buergel; Berndt Boelich, Cospeda; Gerda Weigold, Jena, all of (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/515,048

(22) Filed: Feb. 25, 2000

(30) Foreign Application Priority Data

Dec. 14, 1999 (DE) .............................................. 199 58 567

(51) Int. Cl.[7] .............................. G02B 7/02; G02B 23/00
(52) U.S. Cl. ............................................. 359/822; 359/430
(58) Field of Search ..................... 359/822, 810, 359/811, 430

(56) References Cited

U.S. PATENT DOCUMENTS

| | | |
|---|---|---|
| 3,588,220 | 6/1971 | Wells . |
| 3,779,626 | 12/1973 | Korrenn et al. . |
| 4,458,868 | 7/1984 | Hess . |
| 4,764,881 | * 8/1988 | Gagnon ................................. 359/430 |
| 4,776,684 | 10/1988 | Schmidt-Kaler . |
| 5,621,212 | * 4/1997 | Menke ................................. 250/345 |
| 5,822,116 | 10/1998 | Leblanc . |

FOREIGN PATENT DOCUMENTS

| | | |
|---|---|---|
| 43 00 252 | 7/1994 | (DE) . |
| 23 18 423 | 4/1998 | (GB) . |

OTHER PUBLICATIONS

Article—"Zeiss 3,5–m–Teleskop, ein astronomisches Grobteleskop im Grenzbereich technischer Leistungen", C. Kuhne, In: Zeiss Inform, Oberkochen, 27, 1982, pp. 4–13.
Article—"ABC der Optic", Karl Mutze, In: Verlag Werner Dausien, 1961, pp. 281, 282.
Article—"Die Fernrohre und Entfernungsmesser", In: Springer–Verlag, 1959, pp. 276, 278.

* cited by examiner

Primary Examiner—Georgia Epps
Assistant Examiner—Saeed Seyfrafi
(74) Attorney, Agent, or Firm—Reed Smith LLP

(57) ABSTRACT

A heavy-duty precision support for an optical instrument, especially for an astronomical telescope is disclosed, comprising a base carrier which is mounted on a stationary base so as to be rotatable about a vertical axis and an instrument holder for holding the optical instrument which is supported at the base carrier so as to be swivelable about a horizontal axis. To provide a support which is simple to produce and assemble and which has excellent stiffness, positioning accuracy and dependability, the base carrier is supported against the base in the manner of a ball joint by means of a central bearing. Further, a bearing portion of the base carrier is guided axially at the base.

19 Claims, 2 Drawing Sheets

HEAVY-DUTY PRECISION SUPPORT FOR AN OPTICAL INSTRUMENT

BACKGROUND OF THE INVENTION a) Field of the Invention

The invention is directed to a heavy-duty precision mounting or support for an optical instrument, especially for an astronomical telescope, comprising a base carrier which is mounted on a stationary pedestal or base so as to be rotatable about a vertical axis and an instrument holder which receives the optical instrument and which is supported so as to be swivelable with the optical instrument about a horizontal axis.

b) Description of the Related Art

Supports of the type mentioned above can be used for both altazimuth and equatorial mounting of an optical instrument, for example, of a telescope. The purpose of application results in very exacting demands on the accuracy of the guides and drive units with respect to the alignment of the axes of rotation and very small movement increments which, in addition, must be carried out without jolting or jerking, for example, to enable point-accurate tracking of the relative movement of an observed astronomical object relative to the setup location of the optical instrument in the order of magnitude of a fraction of an arc second.

Because instruments for astronomical observation are usually set up at locations high above sea level to protect against the influence of man-made emissions and since they must also be operated in open spaces, the mounting or support is exposed to fluctuations in temperature within a relatively wide range from +50° C. to −25° C. Further, it must be taken into account that the instrument, including the support, is an accumulator of heat which, when diverging from outside temperatures, causes turbulence that impairs observation possibilities. It is therefore desirable to build the instrument and support so as to be stable but so as to have a small mass.

Heavy-duty precision supports for optical instruments used heretofore are characterized by a highly complex construction of the support, drive unit and position measurement and provide only an unsatisfactory solution to the problem mentioned above.

OBJECT AND SUMMARY OF THE INVENTION

It is the primary object of the invention, on the other hand, to provide a heavy-duty precision support which ensures high availability, dependability and positioning accuracy in a simplified construction.

This object is met by a heavy-duty precision support of the type mentioned above in which the base carrier is supported against the base in its center of rotation close to the vertical axis by a central bearing and, in addition, is guided on the base with supporting bearings which are arranged concentrically around the central bearing and is accordingly secured against tilting around the central bearing.

The axial principal load is introduced into the base in the direction of the vertical axis via the central bearing. The supporting bearings which are arranged around the central bearing serve chiefly to absorb tilting moments. Through the use of this centric bearing, construction costs can be reduced considerably in comparison with conventional solutions.

Further, only a little adjustment work is required for the guides of the base carrier at the base.

The solution according to the invention is further distinguished by very small changes in friction torque and very small wobble error.

In an advantageous arrangement of the invention, the central bearing is constructed as a hydrostatic low-pressure bearing. This is operated within a pressure range of up to 10 bar. Generally, hydrostatic devices involve increased heat radiation which negatively affects observation conditions. Through the use of a low-pressure bearing, heat radiation can be kept to a low level that does not impair observation possibilities.

On the side of the base carrier, the hydrostatic low-pressure bearing preferably has a bearing body which is curved outward in a convex manner in the shape of a spherical surface portion and which is received in a bearing shell that is curved in a correspondingly concave manner and arranged in a stationary manner on the side of the base. This arrangement promotes a self-centering of the bearing so that the base carrier also sits on the base so as to be secured against axial displacement.

For optimum supply of lubricant, the bearing shell is provided at its concave curved surface with lubricant pockets which are supplied, via lubricant feed lines, with lubricant which is under pressure and proportioned or metered. Lubricant is accordingly supplied via the stationary side to avoid costly line connections to the moving bearing element.

In another advantageous arrangement of the invention, the base carrier has a first running surface which is concentric to the vertical axis and which faces in the direction of the base and, when the base carrier rotates about the vertical axis, rolls on supporting rollers of the supporting bearings, which supporting rollers are connected in a stationary manner with the base. Therefore, tilting moments which act on the base carrier, for example, due to wind forces acting on the optical instrument and precision support, can be dependably absorbed. Further, the mass to be moved is kept small by the arrangement of the supporting rollers on sides of the base, so that the base carrier can be exactly positioned with small driving forces.

The supporting rollers are preferably conical and supported so as to be rotatable on an axle which is oriented toward the vertical axis, wherein the outer diameter of the supporting roller tapers in the direction of the vertical axis. An additional centering effect of the base carrier toward the vertical axis is achieved in this way, which further improves the guiding accuracy of the base carrier.

In another preferred embodiment form of the invention, drive units are arranged on the base side, the driven elements of these drive units engaging in a torque-transmitting manner with a second running surface which is likewise constructed concentric to the vertical axis at the base carrier. The resulting solution is particularly simple with respect to construction and avoids a complicated central drive unit.

For optimum absorption of tilting moments, the supporting bearings are arranged equidistant from one another in the circumferential direction.

Introduction of force is further improved preferably when the drive units are arranged in pairs opposite one another with reference to the vertical axis. In this way, the drive units are balanced or compensated with respect to radial force in particular, so that high guiding accuracy and positioning capability of the base carrier can be realized.

In another advantageous arrangement of the invention, a first running surface for the supporting bearings and a second running surface for the drive units are constructed on a dish-like disk which is flanged to the base carrier. Above all, excellent stiffness of the bearing is achieved in this way, which benefits positioning accuracy. This also results in a substantial simplification with respect to manufacturing technique because the running surfaces which are to be produced with very great precision are in a close spatial arrangement with respect to one another. Further, the quantity of structural component parts and therefore also the assembly costs remain advantageously low.

A support of the horizontal axis which is especially simple in technical respects relating to manufacture and assembly, but which works in a highly dependable and accurate manner, results when the instrument holder has an annular flange which is symmetric with respect to rotation with reference to the horizontal axis and whose outer edge area is held axially and radially in a plurality of bearing units arranged at the base carrier, wherein every bearing unit has two axial guide rollers which are arranged at both sides of the annular flange and by which the annular flange is fixed axially, and a bearing roller which supports the annular flange radially.

Due to the fact that the horizontal axis is supported in the bearing units only pointwise, a compact suspension of the instrument holder is made possible, so that the entire mass which is to be moved remains small. This results in the further advantage of a smaller heat accumulator capacity, so that the support can adapt more quickly to the surrounding temperatures. Further, a particularly compact construction is made possible with only limited surfaces exposed to the wind, so that the optical instrument can also be operated under wind conditions which formerly prevented observations.

Each of the axial supporting bearings preferably also comprises in this case a conical roller which is rotatably supported on an axle oriented toward the horizontal axis, wherein the outer diameter of this roller narrows conically in the direction of the horizontal axis. Accordingly, an additional centering effect is also achieved in this case, which further improves the guiding accuracy around the horizontal axis.

A particularly compact driving of the instrument holder about the horizontal axis results in a further arrangement by means of drive units which are arranged at the base carrier and whose driven elements engage directly with the annular flange in a torque-transmitting manner.

A plurality of drive units and bearing units are preferably provided in an alternating manner and equidistant from one another with respect to their points of application in an angular range from approximately 60° to 180°. The drive units are constructed in such a way that their driven elements, apart from the bearing units, receive a defined proportion of the load of the instrument holder.

The shear forces acting on the rotational axis can be kept small in that the weight of the instrument carrier is supported in a uniformly distributed manner, which enables a constantly high positioning accuracy. In addition, by means of the arrangement of the bearing units and drive units in an arc-shaped area below the horizontal axis, the height of the base carrier can be reduced and accordingly the lever arm for applied wind forces can be shortened.

For a particularly stable suspension of the optical instrument, another advantageous arrangement provides the above-mentioned suspension with respect to the horizontal axis on both sides of the instrument, resulting in a fork-shaped construction of the base carrier, wherein the side cheeks of the base carrier are responsible for supporting.

An additional simplification in construction results from the preferred use of friction drive units having a friction roller as driven element, wherein the friction rollers are arranged axially parallel to the vertical axis and horizontal axis and are pretensioned in a defined manner against the first running surface of the base carrier and against the annular flange of the instrument holder under a predetermined load.

The introduction of the driving torque is therefore distributed to a plurality of locations, so that the drive units themselves remain small. By means of a defined pretensioning of the friction rollers against the respective running surface, a slip-free introduction of torque can be realized, so that wear at the running surfaces and friction rollers in particular also remains minimal and, therefore, high durability is achieved and maintenance costs can be kept low.

The friction rollers are preferably coupled directly to the rotor of a drive motor. This allows a particularly compact construction of the drive units by dispensing with any intermediate transmissions, so that, in addition, a savings in weight can be achieved which in turn keeps the moved masses small.

In another advantageous arrangement, there is arranged on the drive unit side at least one position measurement device which reads markings provided at the running surface on the base carrier and at the annular flange of the instrument holder. By arranging the markings in the area of direct engagement of the drive unit, a high controlling accuracy can be achieved on the one hand, wherein resolutions of up to 0.01 arc seconds are possible; further, the markings can be arranged in a simple manner with respect to production techniques at a running surface portion or annular flange constructed as a multifunctional element.

In another advantageous arrangement of the invention, there is provided between the base and the base carrier and/or between the base carrier and instrument holder a slip ring arrangement with slip rings on one side and associated electric contacts on the other side for the transmission of operating voltages and/or electric signals. The slip ring arrangement is arranged centrically around the corresponding axis of rotation in a radially central portion of the bearing portion or of the annular flange. A particularly simple transmission of driving energy to the drive units held by the base carrier for the instrument holder and, as the case may be, for additional electric consumers or measuring devices and the like arranged at the precision support is achieved in this way. In addition, maintenance costs for the transmission of electric energy and for a suitably formed data interface are kept low. Compared with previously used cable drums, there is also a considerable improvement in operational control of the mounting.

Essentially the following advantages can be achieved by the construction according to the invention for a heavy-duty precision support:

friction torques remain low throughout the whole expected temperature field to which an astronomical telescope in particular can be exposed;

with a reduced quantity of mechanical component assemblies, greater precision is achieved compared with previously known comparable arrangements, chiefly with respect to the accuracy of guidance and adjustment;

production costs are lower than in comparable arrangements in spite of increased precision; and modular or building block solutions are possible according to the basic principle of the invention, wherein base carrier bearings with a diameter of up to 15 m can be carried out.

The invention will be described more fully in the following with reference to an embodiment example shown in the drawings.

DESCRIPTION OF THE PREFERRED EMBODIMENTS

Figure 1:
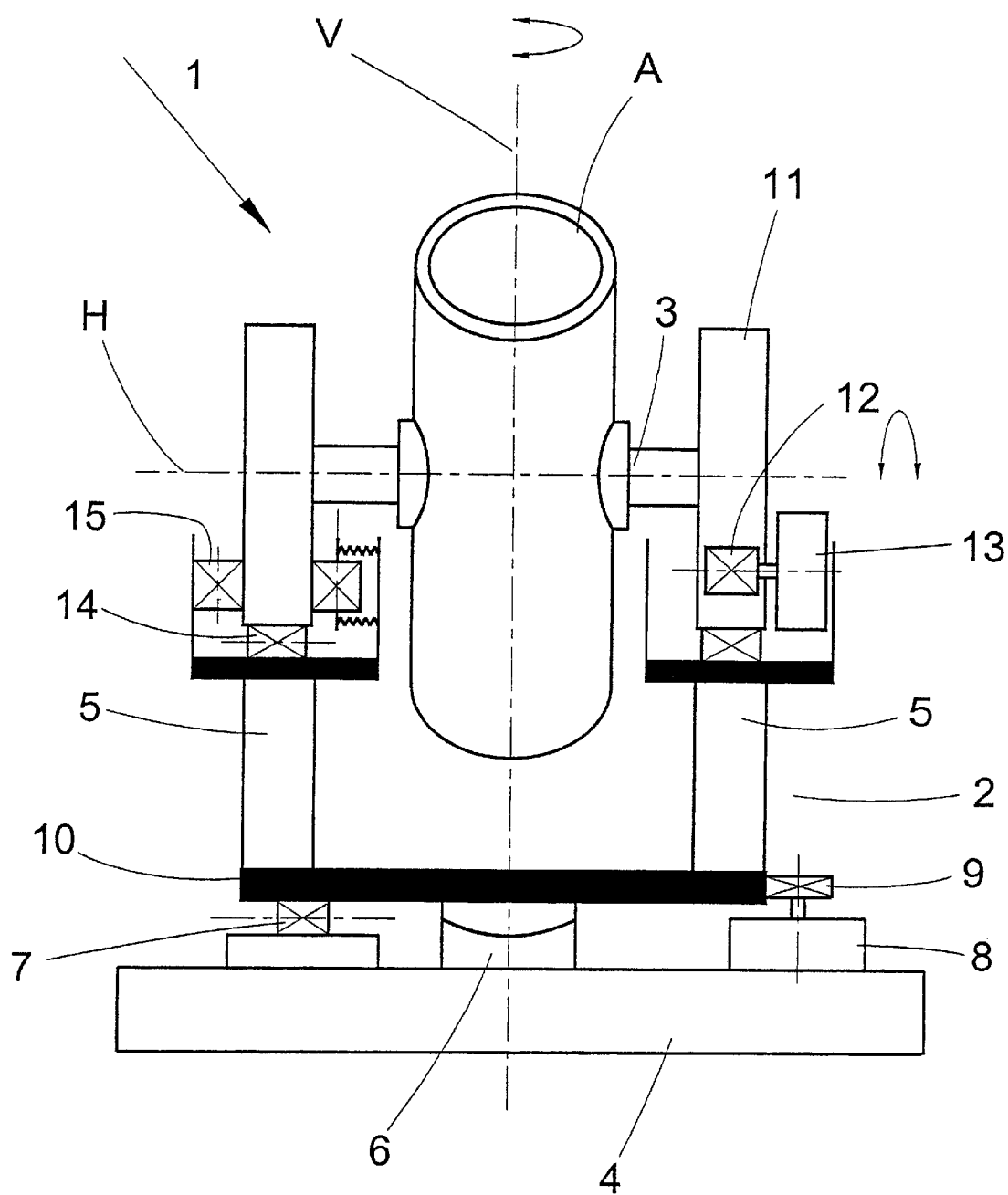
FIG. 1 is a schematic view showing the embodiment example of a heavy-duty precision support in which the respective bearings are shown on the left-hand side and the respective driving devices are shown on the right.

In FIG. 1, the embodiment example shows a heavy-duty precision support 1 for an astronomical telescope A, only suggested in the drawing, which is constructed in this instance as an altazimuth mounting. An essentially fork-shaped base carrier 2 is supported on a base 4 so as to be rotatable about a vertical axis V and is guided relative to the base 4 in the radial direction and in the axial direction with respect to the vertical axis V. At oppositely located side cheeks 5 which can be constructed as a pair of tubular columns with low mass and small surfaces exposed to the wind, an instrument holder 3 for holding the astronomical telescope A is supported so as to be rotatable about a horizontal axis H extending transverse to the vertical axis V. Further, the instrument holder 3 is guided axially as well as radially relative to the base carrier 2, wherein the support shown in FIG. 1 on the left-hand side is also present on the right-hand side.

The supporting of the axial load of the base carrier 2 at the base 4 is carried out via a central bearing 6 which is constructed in the manner of a ball joint and which is arranged concentric to the vertical axis V. This central bearing 6 assumes a guiding function for the base carrier 2 at the base 4 in the axial direction and in the radial direction. Further, additional axial supporting bearings 7 are provided between radial outer areas of the base carrier 2 and the base 4 and prevent a tilting of the base carrier 2 relative to the base 4.

The driving of the base carrier 2 relative to the base 4 is carried out via a drive device with a base-side drive unit 8 and a carrier-side driven element 9 which engages with the circumference of a bearing portion 10 of the base carrier 2 so as to transmit torque. Further, corresponding drive devices are provided between the base carrier 2 and the instrument holder 3, wherein the latter has an annular flange 11 at both sides of the astronomical telescope A, which annular flange 11 is symmetric with respect to rotation relative to the horizontal axis H, wherein driven elements 12 of drive units 13 contact the circumference of this annular flange 12 so as to transmit torque.

The bearing portion 10 and annular flange 11 are constructed as dish-like disks which can be flanged on and which are acted upon at their circumference by the driven elements 9 and 13, respectively. Further, elements of position measurement devices which will be described more fully in the following are provided at the bearing portion 10 and annular flanges 11.

Figure 2:
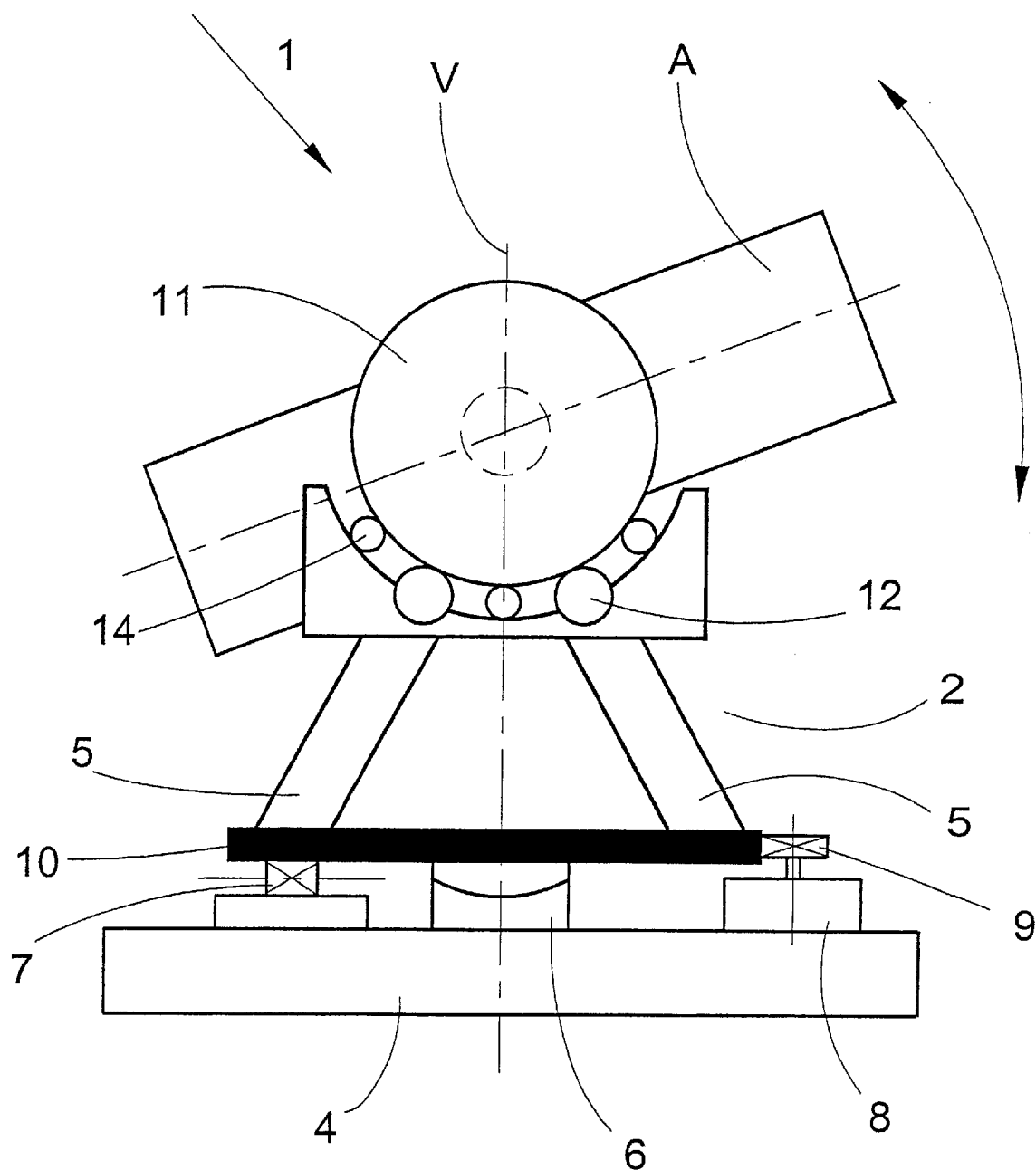
FIG. 2 shows a side view of the heavy-duty precision support from FIG. 1.

The spatial arrangement of the individual drive devices and supports can also be seen particularly from FIG. 2. FIG. 2 shows the distribution of the bearing rollers 14 on which the load of the telescope A, instrument holder 3 and annular flange 11 rests. The driven elements 12 and the bearing roller 14 receive loads within an angular range of approximately 90° at equidistant intervals along the circumference of every annular flange 11.

As can further be seen from FIG. 2, three bearing rollers 14 are provided in the selected embodiment example, one of which lies in the perpendicular to the horizontal axis H. A bearing roller 14 is positioned between two adjacent driven elements 12. Because of the symmetry of the support, the shear forces acting on the horizontal axis H are kept small.

A total of six supporting bearings 7 and six driven elements 9 are arranged so as to be distributed equidistant from one another at the outer circumference of the bearing portion 10. A driven element 9 with associated drive unit 8 arranged on the side of the base 4 is positioned between every two adjacent supporting bearings 7. With smaller diameters of the base carrier 2, even three supporting bearings 7 are sufficient. However, greater quantities, e.g., eight supporting bearings are provided for a more uniform absorption of force.

The individual supports will now be discussed in more detail in the following. The central bearing 6 is constructed as a hydrostatic low-pressure bearing with a pressure range of about 5 to 10 bar. The bearing comprises a bearing body which is curved in a convex manner in the shape of a spherical surface portion and is fastened centrally to the bearing portion 10. The bearing body which is curved in a convex manner is received in a bearing shell which is correspondingly curved in a concave manner and which is arranged in a stationary manner at the base 4. In the embodiment example shown herein, a total of six lubricant pockets which are distributed uniformly along the circumference are provided in the surface of the bearing shell and are supplied, via a lubricant feed distribution line, with lubricant which is under pressure and proportioned in amount. Lubricant which is pushed out between the contacting surfaces of the bearing body and bearing shell is collected via collecting pockets arranged at the radial edge of the central bearing 6 and is returned to the lubricant pockets via a pressure system.

FIG. 1 and FIG. 2, each on the left-hand side, show an axial supporting bearing 7 which rests axially against an annular guide path concentric to the vertical axis V in a radial edge area of the bearing portion 10. The supporting bearing 7 comprises a yoke-shaped base body (not shown in detail) which is fastened on the base side and at which is supported an axle aligned with the vertical axis V. This axle in turn carries the rotatably mounted supporting bearing 7 on which the guide path is supported. This axle is inclined relative to the horizontal line. The extensions of all axes of the supporting bearings 7 intersect in a common point on the vertical axis V. This inclination serves for horizontal alignment of the conical supporting bearing 7 at the point of contact with the guide path, wherein this supporting bearing 7 narrows in diameter in the direction of the vertical axis V. The conical construction of the supporting bearings 7 brings about an additional centering effect on the vertical axis V at the bearing portion 10; this centering effect counteracts the occurrence of wobbling movements. Further, the supporting bearings 7 should advantageously be pretensioned by spring force against the guide path for the purpose of retaining a uniform load distribution in case of dimensional tolerances.

The mounting of the instrument holder 3 at the side cheeks 5 of the base carrier 2 can likewise be seen in principle from FIG. 1 and FIG. 2. In this case, slightly conical axial guide rollers 15 are rotatably supported for contact with the annular flange 11. In order to ensure a precise guidance and to prevent axial twisting, an axial guide roller 15 is suspended in a resiliently flexible manner. For this purpose, a plurality of disk springs connected one behind the other are used in the shown embodiment example.

In order to achieve an additional centering effect, the rotational axes of the axial guide rollers 15 aligned with the horizontal axis H, which axial guide rollers 15 narrow conically in this direction, are arranged at an inclination, wherein the axes of the axial guide rollers 15 arranged on a side of the annular flange 11 intersect at a common point on the horizontal axis H. The intersections of axial guide rollers 15 which are located opposite one another with respect to the annular flange 11 are separated from one another on the horizontal axis H by a length corresponding to the thickness of the annular flange 11 between the axial guide rollers 15.

Further, the circumference of the annular flange 11 has a shoulder which is provided with an incremental marking. This incremental marking cooperates with a position reading device in order to enable a deliberate control and regulation of the movement of the instrument carrier 3 via the drive units 13.

In the selected embodiment example, friction drives are used as drive units 8 and 13, these friction drives comprising an electrically driven motor and a friction roller which is attached directly to the rotor of the latter, driven elements 9 and 12.

The axes of rotation of the drive units 8 and of the driven elements 9 extend parallel to the vertical axis V. To enable transmission of torque which is extensively or entirely free of slip, the driven elements 9 are pretensioned with high force against the circumference of the bearing portion 10. The axes of rotation of the drive units 13 and driven elements 12 extend parallel to the horizontal axis H. The driven elements 12 are pretensioned by high force against the circumference of the annular flange 11. In an alternative embodiment form, teeth may be provided between the driven elements 9 and 12 and the bearing portions 10 and annular flanges 11.

The direct coupling of the driven elements 9 and 12 to the rotors results in a particularly compact constructional shape which allows a torque transmission that is accurate in that it avoids the elasticity of a transmission, so that a superimposed speed regulation of the individual drive devices can be dispensed with when using a plurality of motors.

In order to achieve a high positioning accuracy, markings are provided at least at one of the annular flanges 11 and at the bearing portion 10, which markings are detected by a position reading device which is arranged so as to be stationary. In addition, corresponding rotational projections are formed which serve to receive strip coders and necessary strip locks.

In this connection, a direct high-resolution position measurement is achieved by means of at least one scanning head arranged at the base 4 or at the annular flange 11, wherein only errors of the second order result through the arrangement of the associated position reading devices and drive devices.

In order to supply electricity to the drive units mounted at the base carrier 2 and any additional electric consumers and for signal transmission between the base 4 and the base carrier 2 and between the base carrier 2 and the instrument holder 3, slip ring arrangements are used which are arranged centrally about the corresponding axes V and 11 in a central area of the bearing portion 10 and annular flange 11.

Through the construction of the bearing portion 10 and annular flange 11 as essentially flat bodies which are symmetric with respect to rotation and which can be flanged to other portions of the base carrier 2 or instrument holder 3, there are identical multifunctional parts at which the precision surfaces for the bearing, the drive and the position measurement, including mechanical and electric interfaces, are integrated in an individual structural component part, resulting in a considerable simplification of production and assembly for a heavy-duty precision support.

By means of the conceptually novel arrangement with a central receiving of axial load which takes over radial guidance in addition to axial guidance and by means of the supporting bearings for absorbing tilting moments which are arranged at the greatest possible distance from the centric bearing, the basis is provided for a highly accurate heavy-duty precision support for an optical instrument which is to be operated especially at very low speeds and which allows optimum utilization of the optical instrument based on its high position accuracy and stiffness. Production and assembly costs can be kept low through the use of only few structural component parts with simple geometric shapes.

While the foregoing description and drawings represent the preferred embodiments of the present invention, it will be obvious to those skilled in the art that various changes and modifications may be made therein without departing from the true spirit and scope of the present invention.

Reference Numbers 1 precision support
2 base carrier
3 instrument holder
4 base
5 side cheek
6 central bearing
7 supporting bearing
8 drive unit
9 driven element
10 bearing portion
11 annular flange
12 driven element
13 drive unit
14 bearing rollers
15 axial guide roller
A telescope
H horizontal axis
V vertical axis

What is claimed is:

1. A heavy-duty precision support for an optical instrument, especially for an astronomical telescope, comprising:
    a base carrier which is mounted on a stationary base so as to be rotatable about a vertical axis; and
    an instrument holder which receives an optical instrument and which is supported so as to be swivelable with the optical instrument about a horizontal axis;
    said base carrier being supported against said base in its center of rotation close to the vertical axis by a central bearing and, in addition, being guided on said base with supporting bearings which are arranged concentrically around said central bearing and being secured against tilting around said central bearing.

2. The heavy-duty precision support according to claim 1, wherein the central bearing is constructed as a hydrostatic low-pressure bearing.

3. The heavy-duty precision support according to claim 2, wherein said central bearing has, on the side of said base carrier, a bearing body which is curved in a convex manner in the shape of a spherical portion and which is received in a bearing shell that is curved in a correspondingly concave manner and connected with the base.

4. The heavy-duty precision support according to claim 3, wherein the bearing shell is provided at its curved surface with lubricant pockets which are supplied, via lubricant feed lines, with lubricant which is under pressure and proportioned with respect to quantity.

5. The heavy-duty precision support according to claim 1, wherein the base carrier is provided with a first running surface which is concentric to the vertical axis and which faces in the direction of the base and, when the base carrier rotates about the vertical axis, rolls on supporting rollers of the supporting bearings, which supporting rollers are connected in a stationary manner with the base.

6. The heavy-duty precision support according to claim 5, wherein the supporting rollers are conical and are supported so as to be rotatable on an axle which is oriented toward the vertical axis, wherein the outer diameter of every supporting roller narrows in the direction of the vertical axis.

7. The heavy-duty precision support according to claim 1, wherein drive units are arranged at the base, the driven elements of these drive units engaging in a torque-transmitting manner with a second running surface which is likewise constructed concentric to the vertical axis at the base carrier.

8. The heavy-duty precision support according to claim 1, wherein the supporting rollers of the supporting bearings are arranged so as to be distributed in a radially symmetric manner opposite to the circumference of the first running surface.

9. The heavy-duty precision support according to claim 7, wherein the drive units are arranged in pairs diametrically opposite one another with reference to the vertical axis, so that the torque transmission is effected from the driven elements to the second running surface so as to be free from forces acting radially on the vertical axis.

10. The heavy-duty precision support according to claim 7, wherein the first running surface and the second running surface are formed on a dish-like disk which is flanged to the base carrier and whose contours are produced in only one setup on the manufacturing equipment.

11. The heavy-duty precision support according to claim 1, wherein the instrument holder has an annular flange which is oriented concentric to the horizontal axis and whose edge area is held axially and radially with respect to the horizontal axis by a plurality of bearing units arranged at the base carrier, wherein every bearing unit has two axial guide rollers which are arranged at both sides of the annular flange and by which the annular flange is fixed axially, and additional bearing rollers which support the annular flange radially.

12. The heavy-duty precision support according to claim 11, wherein the axial guide rollers are cone-shaped and are rotatably mounted on an axle which is oriented toward the horizontal axis, wherein the outer diameter of the axial guide rollers narrows conically in the direction of the horizontal axis.

13. The heavy-duty precision support according to claim 11, wherein drive units are arranged at the base carrier and having driven elements which engage directly with an annular flange in a torque-transmitting manner.

14. The heavy-duty precision support according to claim 11, wherein a plurality of drive units and bearing rollers are arranged in an alternating manner and equidistant from one another with respect to their points of application.

15. The heavy-duty precision support according to claim 11, wherein the base carrier has two side cheeks and the instrument holder has two annular flanges, wherein each annular flange is connected with a side cheek at either side of the optical instrument.

16. The heavy-duty precision support according to claim 7, wherein the drive units are constructed as friction drive units, each having a friction roller as driven element, wherein the friction rollers are arranged axially parallel to the vertical axis and horizontal axis and are pretensioned in a defined manner against the first running surface or against the annular flange under a predetermined load.

17. The heavy-duty precision support according to claim 16, wherein the friction rollers are each coupled directly to the rotors of the electromechanical drive units.

18. The heavy-duty precision support according to claim 1, wherein there is arranged on the side of the drive units at least one position measurement device which reads markings provided at the first and/or second running surface or annular flange during rotation about the vertical axis or during rotation about the horizontal axis, respectively.

19. The heavy-duty precision support according to claim 1, wherein there is provided between the base and the base carrier and/or between the base carrier and instrument holder a slip ring arrangement with slip rings on one side and electric contacts associated with the latter on the other side for the transmission of operating voltages and/or electric signals, wherein the slip ring arrangement is arranged concentrically around the vertical axis or horizontal axis, respectively.

* * * * *